US010333946B1

United States Patent
Hitchcock et al.

(10) Patent No.: US 10,333,946 B1
(45) Date of Patent: Jun. 25, 2019

(54) DISTRIBUTING VARIABLE ENTROPY EPHEMERAL SECURITY CREDENTIALS ACROSS CHANNELS OF VARIABLE ASSURANCE

(71) Applicant: Amazon Technologies, Inc., Seattle, WA (US)

(72) Inventors: Daniel Wade Hitchcock, Bothell, WA (US); Bharath Kumar Bhimanaik, Sammamish, WA (US); Robert Ellis Lee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 404 days.

(21) Appl. No.: 15/189,493

(22) Filed: Jun. 22, 2016

(51) Int. Cl.
*H04L 29/06* (2006.01)

(52) U.S. Cl.
CPC ............ *H04L 63/126* (2013.01); *H04L 63/18* (2013.01)

(58) Field of Classification Search
CPC ..................................................... H04L 63/126
USPC .............................................................. 726/6
See application file for complete search history.

(56) References Cited

U.S. PATENT DOCUMENTS

| | | | | |
|---|---|---|---|---|
| 8,078,881 | B1 * | 12/2011 | Liu | G06F 21/31 713/183 |
| 9,799,030 | B2 * | 10/2017 | Hibbard | G06F 21/53 |
| 9,954,867 | B1 * | 4/2018 | Johansson | H04L 63/102 |
| 2007/0289002 | A1 * | 12/2007 | van der Horst | G06F 21/42 726/9 |
| 2009/0106829 | A1 * | 4/2009 | Thoursie | H04L 63/083 726/9 |
| 2012/0311329 | A1 * | 12/2012 | Medina | H04L 51/04 713/168 |
| 2013/0091585 | A1 * | 4/2013 | Dumais | H04L 63/126 726/27 |
| 2013/0124186 | A1 * | 5/2013 | Donabedian | G06F 17/289 704/2 |
| 2013/0227662 | A1 * | 8/2013 | Crampton | H04L 63/10 726/6 |
| 2013/0276078 | A1 * | 10/2013 | Rockwell | G06F 21/43 726/7 |

(Continued)

OTHER PUBLICATIONS

Wikipedia, the free encyclopedia, "Shamir's Secret Sharing", 5 pages, retrieved Jun. 22, 2016, https://en.wikipedia.org/wiki/Shamir's_Secret_Sharing.

*Primary Examiner* — Farid Homayounmehr
*Assistant Examiner* — Thanh T Le
(74) *Attorney, Agent, or Firm* — Thomas | Horstemeyer, LLp

(57) ABSTRACT

Disclosed are various embodiments for distributing and verifying ephemeral security credentials of variable entropy across channels of communication of variable levels of security assurance. In one embodiment, a security credential is generated for a user account. A subset of a set of communication channels associated with the user account is determined based at least in part on respective measures of entropy and/or security assurance corresponding to individual ones of the set of communication channels. The security credential is divided into multiple portions. A corresponding portion of the portions is sent across individual channels of subset of channels. A client computing device is authenticated for access to the user account based at least in part on receiving the portions of the security credential.

20 Claims, 6 Drawing Sheets

(56) References Cited

U.S. PATENT DOCUMENTS

| | | | | |
|---|---|---|---|---|
| 2014/0189837 A1* | 7/2014 | Maurer | ............... | H04W 12/06 |
| | | | | 726/7 |
| 2015/0067819 A1* | 3/2015 | Shribman | ............... | H04L 67/06 |
| | | | | 726/12 |
| 2015/0200933 A1* | 7/2015 | Charette | ............. | H04L 63/0815 |
| | | | | 726/8 |
| 2015/0244522 A1* | 8/2015 | Cheruvath | ............ | H04L 9/0894 |
| | | | | 713/183 |
| 2015/0249627 A1* | 9/2015 | Jimenez | ............... | H04L 51/066 |
| | | | | 709/206 |
| 2015/0341298 A1* | 11/2015 | Blinn | ...................... | H04L 51/18 |
| | | | | 709/206 |
| 2016/0103982 A1* | 4/2016 | Boss | ...................... | G06F 21/31 |
| | | | | 726/7 |
| 2016/0117499 A1* | 4/2016 | Roy | ........................ | G06F 21/31 |
| | | | | 726/6 |
| 2016/0323450 A1* | 11/2016 | Disraeli | ................ | H04W 12/06 |
| 2018/0025670 A1* | 1/2018 | Ikarashi | ................... | G09C 1/00 |
| | | | | 380/28 |

\* cited by examiner

US 10,333,946 B1

DISTRIBUTING VARIABLE ENTROPY EPHEMERAL SECURITY CREDENTIALS ACROSS CHANNELS OF VARIABLE ASSURANCE

BACKGROUND

Ephemeral security credentials are often issued by a service provider if a user loses access to an account but otherwise has access to a channel of communication previously associated with the account. For example, if a user forgets his or her password, the user may be able to access a "password reset" function of a service provider that sends an ephemeral security credential such as an alphanumeric token to the email address previously registered with the account. When the user subsequently provides the token to the service provider, the user thereby proves that he or she has access to the email address, which may be regarded by the service provider as confirming the user's identity.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
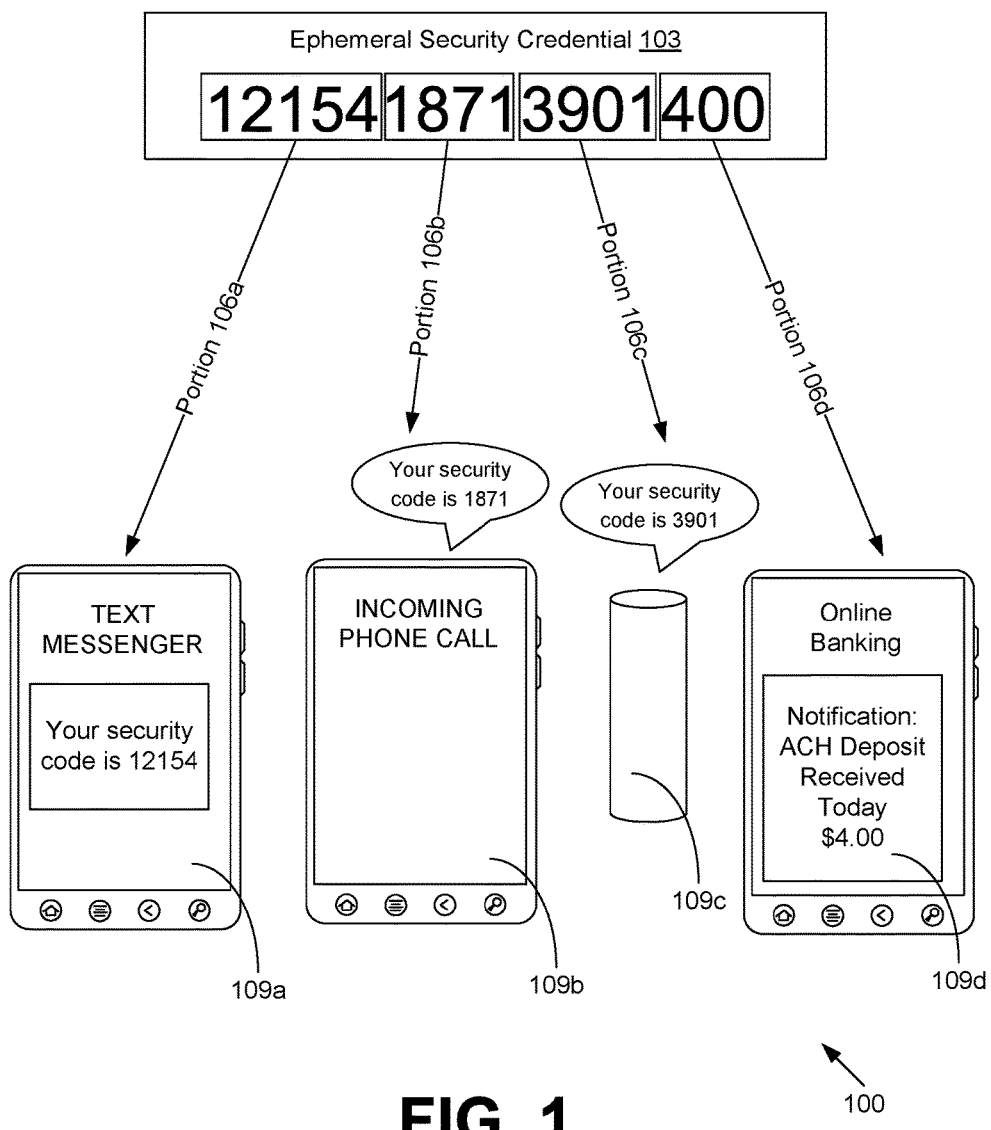
FIG. 1 is a drawing of an example scenario of distributing an ephemeral security credential according to an embodiment of the present disclosure.

The present disclosure relates to distributing ephemeral security credentials that may have varying degrees of entropy across communication channels that may have varying degrees of assurance. Ephemeral security credentials, such as one-time passwords, tokens, or numerical codes, may be used to reset or recover long-term security credentials or as part of multi-factor authentication approaches. Ephemeral security credentials are typically valid only for a limited period of time (e.g., five minutes, one hour, etc.) and/or a limited number of uses (e.g., one-time usage). Thus, if a malicious user obtains an ephemeral security credential at a later time, the credential cannot be used for authentication.

Ephemeral security credentials can be communicated to a user through one or more communication channels that a user has previously associated with or registered to an account. For example, an ephemeral security credential may be communicated via email to a registered email address, via text message or voice message to a registered phone number, via a microdeposit to a registered bank account or credit account, via conventional mail to a registered postal address, or via other communication channels. Overall security may be improved by splitting the ephemeral security credential across a plurality of communication channels, which may be equivalent to sending a separate ephemeral security credential across each of multiple communication channels.

Different communication channels may support differing degrees of entropy. As referred to herein, entropy relates to the number of potential security credentials that can be supported by a given communications channel. For instance, a token sent by a Short Message Service (SMS) may have a character limit of 160 alphanumeric characters. By contrast, a microdeposit to a bank account may be limited to values between $0.01 and $9.99, which provides only 999 possible combinations and thus substantially lower entropy than an SMS token. Higher entropy results in a security credential that is less vulnerable to brute force cracking techniques that can test all possible combinations. Where security credentials are formulated in terms of characters in a string, length of the string and allowed character set may each contribute to entropy.

Different communication channels may offer differing degrees of security assurance. In this regard, some channels may be more easily compromised than others. More easily compromised channels may have a relatively low degree of security assurance, while highly secure channels may have a relatively high degree of security assurance. It is noted that the security assurance of a channel may change over time. For instance, a particular telephone company may become compromised, allowing for spoofing of telephone numbers to improperly receive the text messages of others.

Various embodiments of the present disclosure select a subset of available communication channels associated with a user account for distributing an ephemeral security credential, where the subset can be dynamically selected based on security assurance, entropy, and other factors. For example, a larger quantity of lower assurance and entropy channels may be used to transmit an ephemeral security credential in lieu of fewer higher assurance and entropy channels. In addition, one or more available communication channels associated with a user account may be dynamically selected in order to receive the ephemeral security credential from the user for verification purposes. Furthermore, the quantity and types of communication channels may be selected according to a cost to use the channel and an ease of use of the channel.

Referring now to FIG. 1, shown is a drawing of an example scenario 100 of distributing an ephemeral security credential according to an embodiment of the present disclosure. In the example scenario 100, an ephemeral security credential 103 has been generated. This ephemeral security credential 103 corresponds to a sixteen-digit string of numbers. The ephemeral security credential 103 is to be distributed as portions 106 among a subset of communication channels 109 that are associated with a user account. In this instance, the ephemeral security credential 103 is divided into four portions 106 that are distributed among four communication channels 109. The combination of communication channels 109 can be selected based at least in part on one or more of their supported entropy, cost, user friction, and level of security assurance as will be described.

Portion 106a, a five-digit code, is sent in a text message to a telephone number associated with the user account, which is considered communication channel 109a. Portion 106b, a four-digit code, is sent via a voice message in a call to a telephone number associated with the user account, which is considered communication channel 109b. This telephone number may be the same as or different from the telephone number to which the text message is sent. Portion 106c, a four-digit code, is sent via a voice message to a speaker of a networked audio device associated with the user account, which is considered communication channel 109c. Portion 106d, a three-digit code, is sent as a microdeposit to a bank account associated with the user account, which is considered communication channel 109d.

Upon receiving portions 106a-106d, a user may then provide the portions 106 back to an authentication service to confirm his or her identity and obtain access to one or more secured resources associated with the user account. The user may be provide the portions 106 in a form in a web page or mobile application or via other communication channels 109 as will be described. In some cases, a portion 106 may correspond to activation of a possession factor (e.g., a button device ordinarily configured to place orders for a type of good). In the following discussion, a general description of the system and its components is provided, followed by a discussion of the operation of the same.

Figure 2:
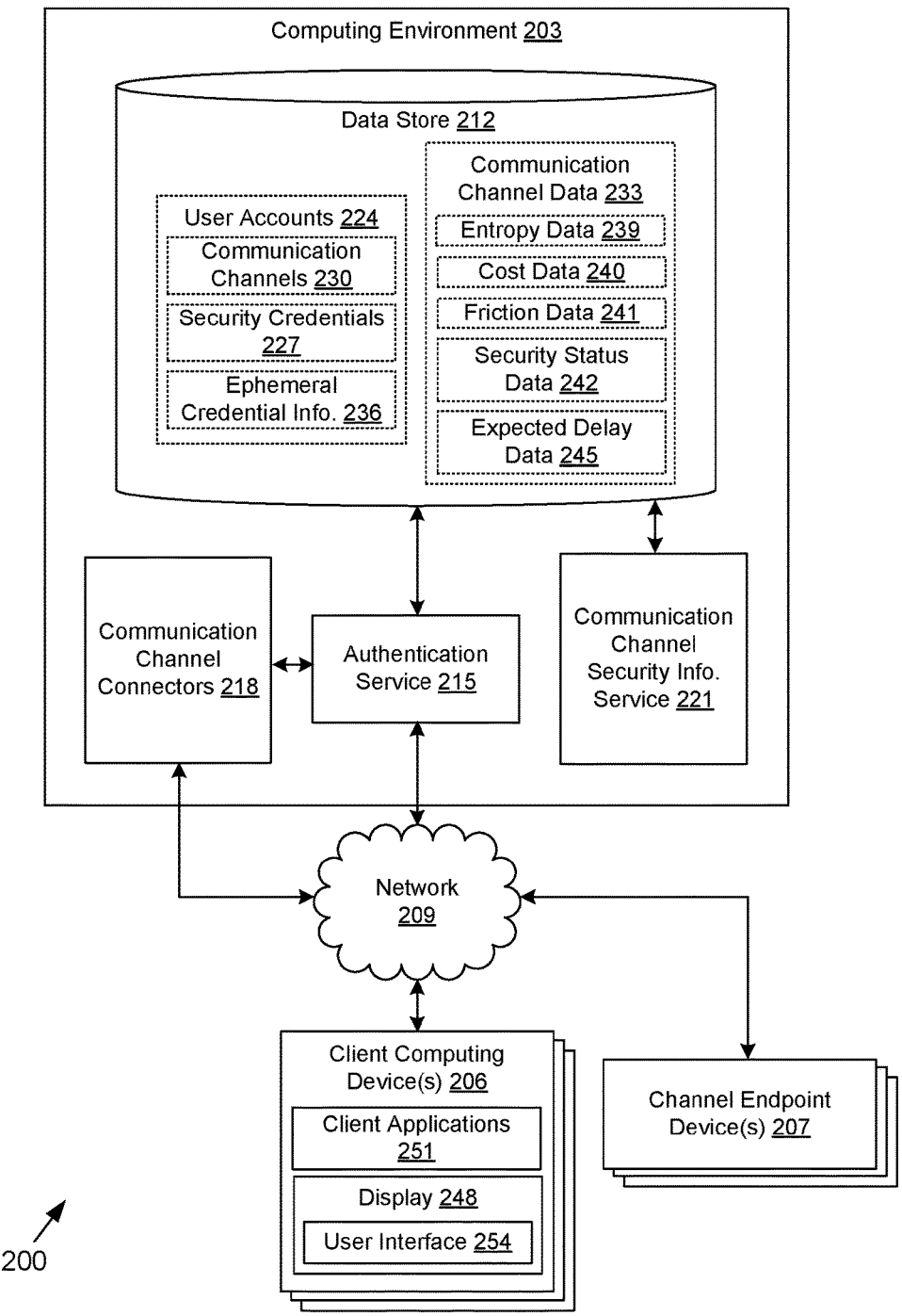
FIG. 2 is a schematic block diagram of a networked environment according to various embodiments of the present disclosure.

With reference to FIG. 2, shown is a networked environment 200 according to various embodiments. The networked environment 200 includes a computing environment 203, one or more client computing devices 206, and one or more channel endpoint devices 207, which are in data communication via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an authentication service 215, communication channel connectors 218, a communication channel security information service 221, and other applications, services, processes, systems, engines, or functionality not discussed in detail herein. The authentication service 215 is executed to authenticate client computing devices 206 for access to resources associated with user accounts 224. In one embodiment, the authentication service 215 may comprise a third-party federated identity provider. In another embodiment, the authentication service 215 may comprise an organization-specific identity provider. The authentication service 215 may issue authentication tokens to confirm that a client computing device 206 is authenticated. In issuing such tokens, the authentication service 215 may employ OAuth, OpenID, security assertion markup language (SAML), or other technologies.

In some scenarios, the authentication service 215 may simply authenticate client computing devices 206 upon presentation of valid security credentials 227 that are associated with a user account 224. However, in other scenarios, the authentication service 215 may be configured to generate ephemeral security credentials and transmit them to communication channels 230 associated with the user account 224 in order to confirm the user's identity. This may be performed when a user attempts to sign-in via a client computing device 206 that does not present a registration credential (i.e., where the client computing device 206 has not been previously or recently used to sign-in for the particular user account 224), when the client computing device 206 has a network address in a foreign country, when invalid security credentials 227 have been presented by the client computing device 206, when the user account 224 has been associated with potentially fraudulent activity, or in other situations where a higher standard of authentication is deemed necessary. Ephemeral security credentials may also be generated in cases where the user forgets or loses access to the security credentials 227 in order to reset or recover the security credentials 227.

The communication channel connectors 218 are configured to enable the authentication service 215 to send and/or receive portions of security credentials 227 over a variety of different communication channels 230. As non-limiting examples, the communication channel connectors 218 may include software and/or hardware to facilitate sending or receiving text messages over short message service (SMS), transmitting or receiving voice messages via telephone calls, generating printed materials to be sent by mail or courier, initiating deposits into or withdrawals from bank accounts, initiating credits or debits relative to a payment card account, sending or receiving email messages, sending or receiving messages via a social networking platform, receiving notifications that button devices have been activated, generating network pages such as web pages and receiving form submissions, sending or receiving voice messages through a networked audio device, and so on. To this end, the communication channel connectors 218 may integrate with a variety of application programming interfaces (APIs) supported by the various communication channels 230 to send an email, place a telephone call, send a text message, etc. The communication channel connectors 218 may support speech recognition and speech synthesis in some implementations.

The communication channel security information service 221 is executed to receive security status updates regarding the communication channels 230. These security status updates may include notification of security vulnerabilities, changes in supported entropy, information about security practices, and other information that bears upon the security assurance provided by a given communication channel 230. For example, where the communication channel 230 is an email address through a particular email provider, the communication channel security information service 221 may obtain information regarding a compromise of passwords associated with the particular email provider, which may lower the security assurance. As another example, where the communication channel 230 is a bank account, the communication channel security information service 221 may obtain information that the security policies of the corresponding bank have been upgraded. The communication channel security information service 221 may receive this information as data feed from security information providers. In other cases, the communication channel security information service 221 may receive this information through a manual reporting interface.

The data stored in the data store 212 includes, for example, data relating to user accounts 224, communication channel data 233, and potentially other data. The user accounts 224 may correspond to a federated or non-federated identity of a user, whereby logging in via the user account 224 gives the user access to protected resources or personalizations. The user accounts 224 may be associated with a set of communication channels 230, security credentials 227, ephemeral credential information 236, and/or other data.

The communication channels 230 correspond to approaches for communicating with the user that are entered explicitly by the user when enrolling or while authenticated (e.g., a user enters an email address) or are determined through an analysis (e.g., mailing address discovered for name of user through public directory). The communication channels 230 may be verified or unverified. To verify a communication channel 230, an ephemeral security credential may be sent to the user via the communication channel 230 and the user may then report back the credential, thereby confirming access via the communication channel 230. Alternatively, a verification service may report a verification for a bank account, payment instrument, or other communication channel 230 given identifying information. For example, a verification service may verify a credit card account given a credit card number, cardholder name, and billing postal code. Verified communication channels 230 may correspond to higher levels of security assurance as compared to unverified communication channels 230.

The security credentials 227 correspond to established credentials for accessing a user account 224. Non-limiting examples may include usernames, passwords, private keys, persistent registration credentials, profiles of client computing devices 206, personal identification numbers, answers to knowledge-based questions, biometric profiles (e.g., fingerprint profiles, voice profiles), information to correlate one-time passwords from hardware tokens, and/or other credentials. The authentication service 215 may normally require one or more of the security credentials 227 to authenticate client computing device 206 for access to resources of a user account 224.

The ephemeral credential information 236 corresponds to information about ephemeral security credentials that have been generated for a user account 224. This may include a time limit for using the ephemeral security credential, a maximum number of permitted uses, an elapsed time since the credential was generated, and a current number of uses. The ephemeral credential information 236 may record what portions of an ephemeral security credential were sent by which communication channels 230.

The communication channel data 233 provides various metadata regarding communication channels 230 associated with user accounts 224. This data can include entropy data 239, cost data 240, friction data 241, security status data 242, expected delay data 245, and/or other data. The entropy data 239 indicates the supported entropy for each communication channel 230. The entropy indicates the amount of information that can be transmitted as a security credential via the communication channel 230, which may be limited by inherent characteristics of the communication channel 230 or by practical limitations involving the use of the communication channel 230. The higher the entropy, the more resistant the security credential will be to compromise via a brute-force cracking approach. These limits may be discovered automatically or configured manually, and may also change from time to time. The entropy may also be limited by a character set through which the communication channel 230 may express information.

For example, a bank account may support microdeposits of $0.01 to $9.99 (e.g., amounts over $9.99 may be deemed too risky to guarantee recovery through a corresponding withdrawal), which may be translated to numerical codes between 001 and 999. A text messaging service may support a 160-character long alphanumerical code. An email message may support up to a five-megabyte Unicode message. A networked audio device or telephone call voice message may support up to a seven-digit numerical code or a dictionary word due to subjective or objective limitations in human working memory.

The cost data 240 may indicate a cost associated with various communication channels 230. While sending or receiving communications via some communication channels 230 may be free, there may be a non-zero cost for other communication channels 230. As an example, either the sender or the recipient may have to pay for text messages sent by SMS. As another example, there may be a small cost associated with making a microdeposit.

The friction data 241 may describe levels of user friction, or ease of use, associated with communication channels 230. For example, it may be relatively simple (i.e., a relatively low level of user friction) to click on a link in an email to confirm communication via an email communication channel 230. However, a user may become frustrated (i.e., a relatively high level of user friction) with having to log in to a bank account, determine what amount was just deposited, and then report that back to verify access to the bank account.

The security status data 242 may be processed to determine a current level of security assurance for a given communication channel 230. The security status data 242 may include objective reports of security compromises, security upgrades, security precautions, and so on, relative to a provider of a communication channel 230. The security status data 242 may also incorporate subjective classifications of communication channels 230 by security professionals.

This security status data 242 may be processed via a weighted combination of factors in order to compute a level of security assurance. The level of security assurance may be initially determined when the communication channel 230 is added to the user account 224. Also, the level of security assurance may fluctuate over time as information is obtained about the security status of the communication channel 230. A feedback loop may be incorporated to consider when user accounts 224 are compromised or used for fraudulent activity. These compromises may be then associated with communication channels 230 through root-cause analysis, which would then negatively impact the level of security assurance for the given communication channels 230.

The expected delay data 245 indicates the expected delay in which a response to a portion of a security credential is expected when the portion is transmitted via a communication channel 230. This can include user-caused human delay as well as delays inherent in the medium of the communication channel 230. For example, a response to a text message or an email may be associated with a delay of several minutes, depending on network congestion. A response to material sent by first class mail may be associated with a delay measured in days depending on the location of the user. A response to a microdeposit may be a few days depending on time involved in crediting the deposit through the automated clearing house (ACH). The expected delay data 245 may be empirically determined as a baseline across multiple users' communication channels 230 through the same or similar providers. A scaling factor based on the individual users may also be applied based upon how much time the user has taken in the past to return security credentials.

The client computing device 206 is representative of a plurality of client devices that may be coupled to the network 209. The client computing device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, button devices, or other devices. The client computing device 206 may include a display 248. The display 248 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client computing device 206 may be configured to execute various applications such as a client application 251 and/or other applications. The client application 251 may be executed in a client computing device 206, for example, to access network content served up by the computing environment 203 and/or other servers, thereby rendering a user interface 254 on the display 248. To this end, the client application 251 may comprise, for example, a browser, a dedicated application, etc., and the user interface 254 may comprise a network page, an application screen, etc. The client computing device 206 may be configured to execute other client applications 251 such as, for example, email applications, social networking applications, phone dialer applications, text messaging applications, speech interface applications, online banking applications, word processors, spreadsheets, and/or other applications.

The channel endpoint devices 207 are configured to receive communications via one or more communication channels 230. The channel endpoint devices 207 may be the same as the client computing device 206 but may also include non-computing devices, such as conventional landline telephones that receive voice calls.

Figure 3A:
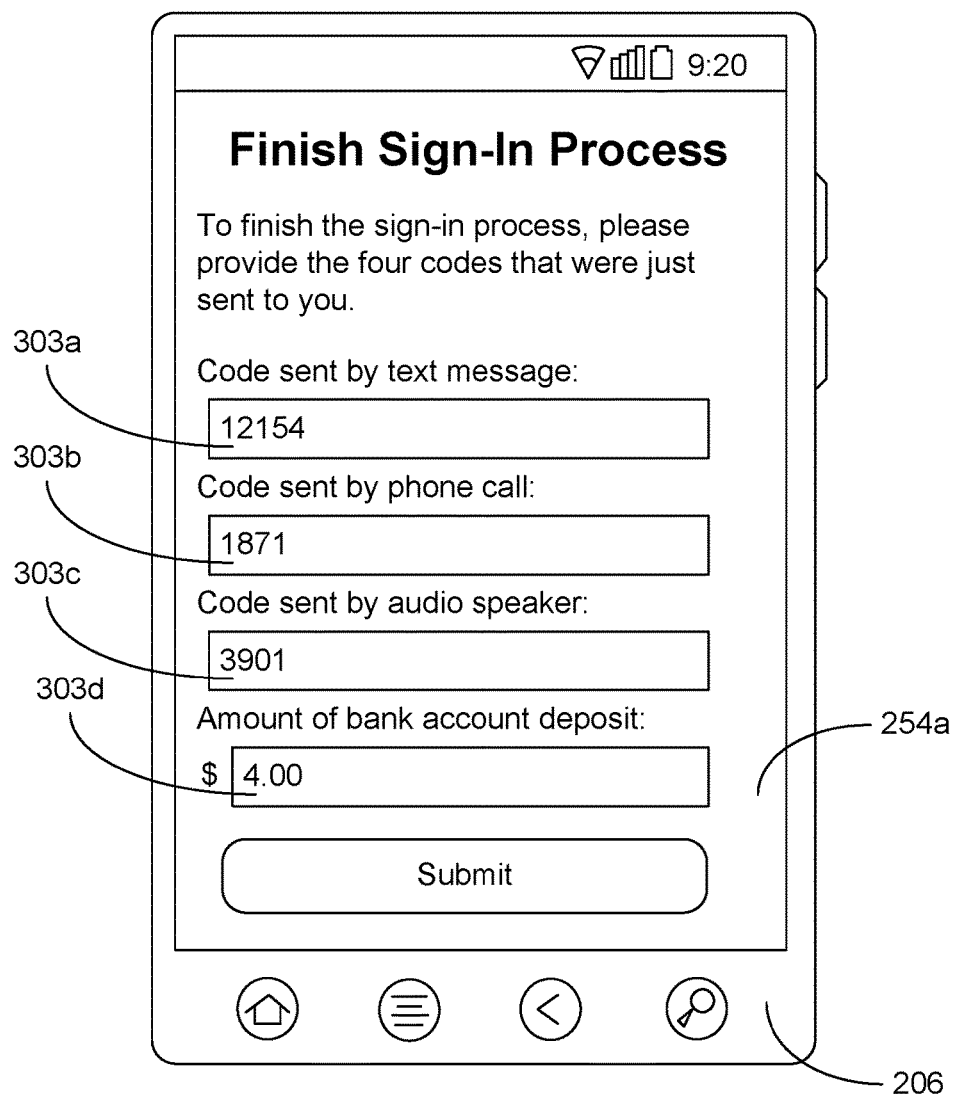
FIGS. 3A and 3B are pictorial diagrams of example user interfaces rendered by a client computing device in the networked environment of FIG. 2 according to various embodiments of the present disclosure.

Turning now to FIG. 3A, shown is an example user interface 254a rendered by a client computing device 206 in the networked environment 200 (FIG. 2) according to various embodiments. The user interface 254a in FIG. 3A is configured to receive the portions 106 (FIG. 1) of the ephemeral security credential 103 (FIG. 1) as shown in the example scenario 100 in FIG. 1. In this example, the user interface 254a includes a form with a plurality of fields 303 configured to receive the respective portions 106. The field 303a is configured to receive the portion 106a sent by text message, the field 303b is configured to receive the portion 106b sent by telephone call, the field 303c is configured to receive the portion 106c sent by a networked audio device, and the field 303d is configured to receive the portion 106d sent as a microdeposit to a bank account. Upon submitting the form and verification of the codes, the client computing device 206 can then be authenticated for access to the user account 224 (FIG. 2).

Figure 3B:
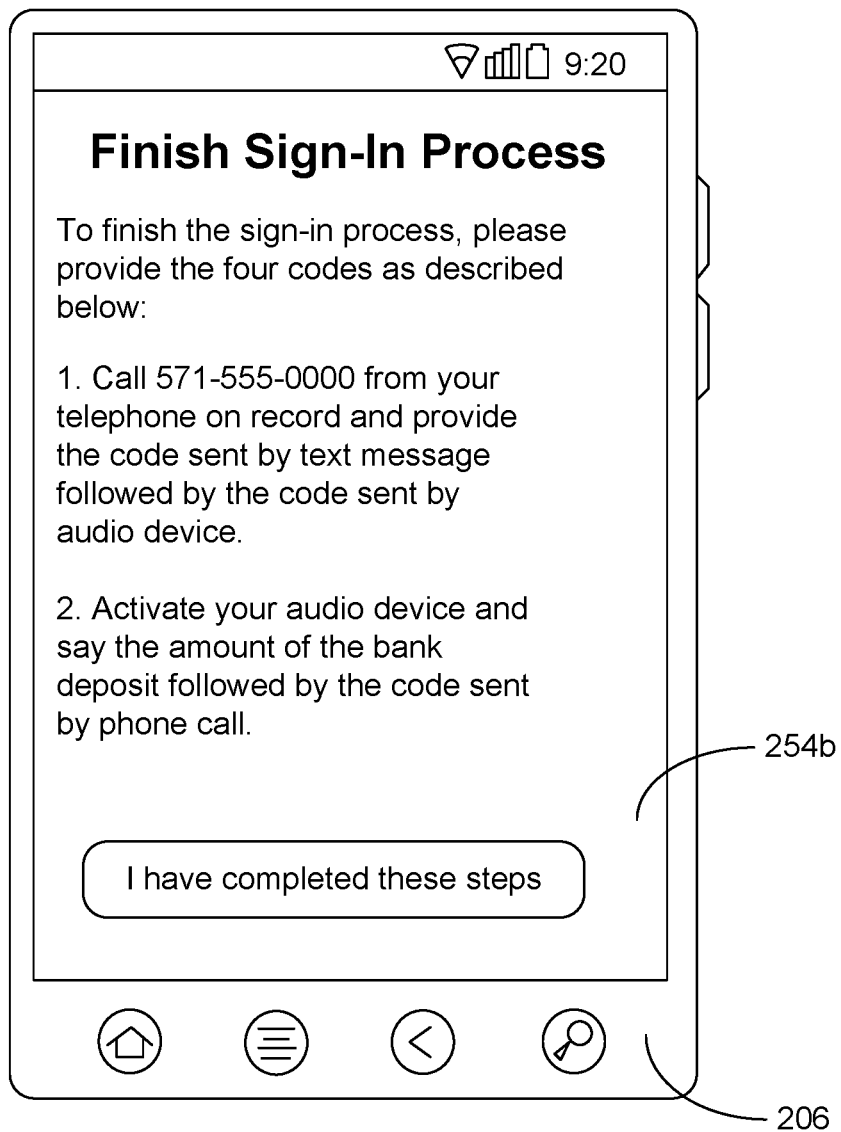

Moving on to FIG. 3B, shown is an example user interface 254b rendered by a client computing device 206 in the networked environment 200 (FIG. 2) according to various embodiments. The user interface 254b in FIG. 3B is configured to instruct the user on how to return the portions 106 (FIG. 1) of the ephemeral security credential 103 (FIG. 1) as shown in the example scenario 100 in FIG. 1. Rather than receiving the portions 106 by a network page form as in the example of FIG. 3A, the user interface 254b instructs the user to return the portion 106a sent by text message and the portion 106c sent by a speaker of a networked audio device, where these portions 106a and 106c are to be returned via a telephone call to a specified telephone number from the user's telephone number of record.

The user interface 254b in this example also instructs the user to return the portion 106d sent as a microdeposit and the portion 106b sent by telephone call by activating a networked audio device. It is noted that in this non-limiting example, the portions 106 are returned via a different communication channel 230 (FIG. 2) than the one through it was sent, and the portions 106 are returned through fewer communication channels 230 (two) than the number of communication channels 230 through which they were sent (four).

Figure 4:
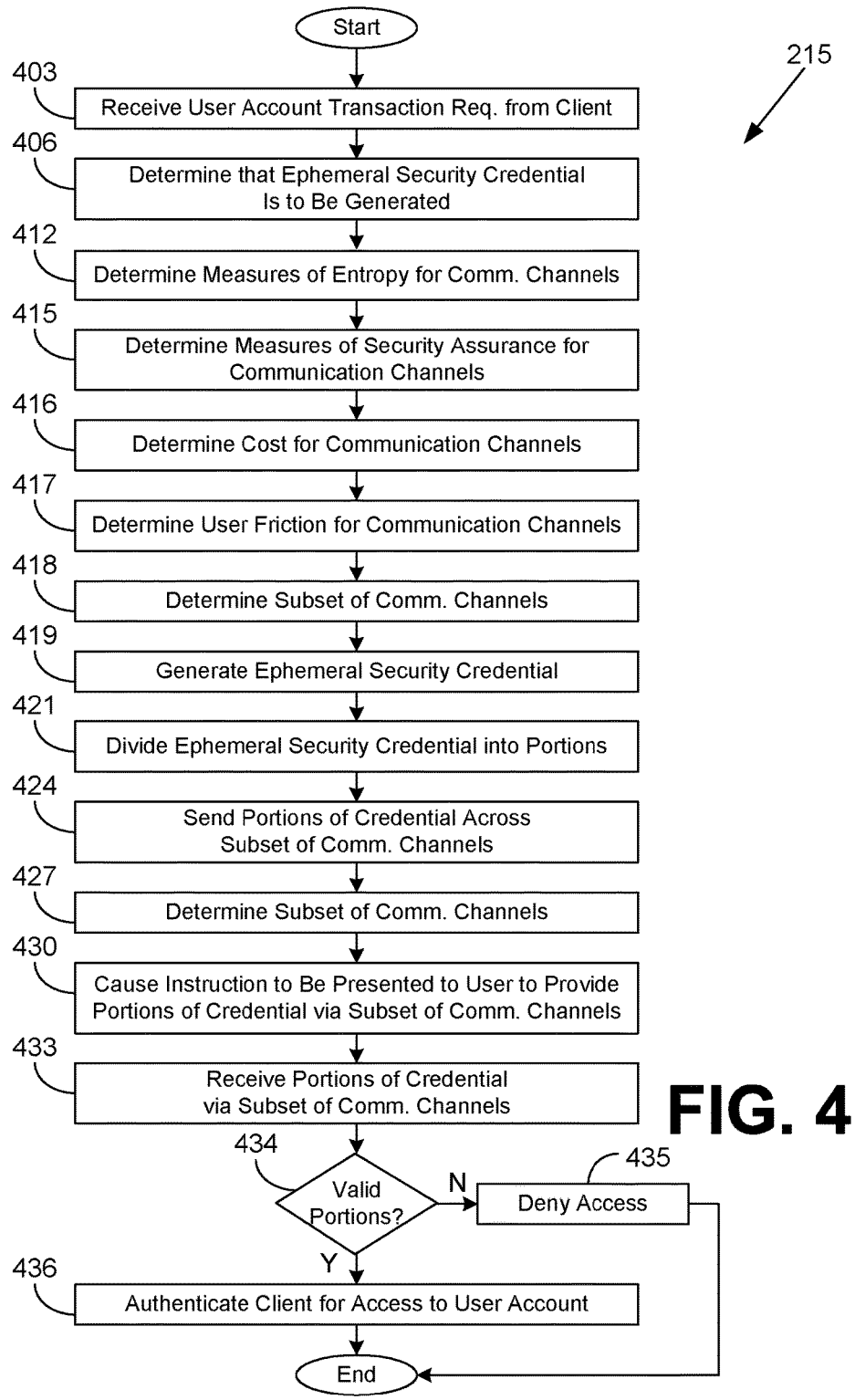
FIG. 4 is a flowchart illustrating one example of functionality implemented as portions of an authentication service executed in a computing environment in the networked environment of FIG. 2 according to various embodiments of the present disclosure.

Referring next to FIG. 4, shown is a flowchart that provides one example of the operation of a portion of the authentication service 215 according to various embodiments. It is understood that the flowchart of FIG. 4 provides merely an example of the many different types of functional arrangements that may be employed to implement the operation of the portion of the authentication service 215 as described herein. As an alternative, the flowchart of FIG. 4 may be viewed as depicting an example of elements of a method implemented in the computing environment 203 (FIG. 2) according to one or more embodiments.

Beginning with box 403, the authentication service 215 receives a transaction request for a user account 224 (FIG. 2) from a client computing device 206 (FIG. 2) via the network 209 (FIG. 2). The transaction request may be a login request that may specify one or more security credentials 227 (FIG. 2) that are used to sign into the user account 224. Alternatively, the transaction request may be to access additional secured resources of the user account after the user has already logged in. The transaction request may correspond to any request where an authentication challenge is deemed necessary.

In box 406, the authentication service 215 determines that an ephemeral security credential 103 (FIG. 2) is to be generated. Although the discussion herein involves an ephemeral security credential 103, it is understood that the principles of the present disclosure may involve a security credential that is neither time limited nor number of uses limited. The authentication service 215 may determine to generate the ephemeral security credential 103 based on some doubt or uncertainty involving the client computing device 206 based at least in part one or more risk factors, or if the client computing device 206 has requested to reset or recover a security credential 227.

In box 412, the authentication service 215 determines respective measures of entropy for each of the communication channels 230 associated with the user account 224 from the entropy data 239 (FIG. 2). For example, the authentication service 215 may determine that bank account microdeposits support values between 0.01 and 19.99. In another example, the authentication service 215 may determine that a user can remember four digits at a time when presented in a voice message by telephone call or by a networked audio device. Thus, the measures of entropy may depend on channel-specific as well as user-specific factors. The measure of entropy may be recalculated from time to time or periodically.

In box 415, the authentication service 215 determines measures of security assurance for each of the communication channels 230 associated with the user account 224 from the security status data 242 (FIG. 2). The measure of security assurance relate to how likely the communication channels 230 are to be compromised. For example, an email account may be associated with a low security assurance if a password breach involving the email provider has recently been reported. Various updates to the security status data 242 may be applied via the communication channel security information service 221. Also, over time, it may be observed by the authentication service 215 how often particular types of communication channels 230 are correlated with security breaches of user accounts 224. This may result in an increased or decreased reputational score as part of the measure of security assurance. In various scenarios, the measure of security assurance may be based at least in part on the known transport security associated with the particular communication channel 230 (e.g., how many entities are privy to the channel and the endpoints where it is decrypted). The measure of security assurance may be recalculated from time to time or periodically.

In box 416, the authentication service 215 determines costs for each of the communication channels 230 associated with the user account 224 from the cost data 240 (FIG. 2). In box 417, the authentication service 215 determines levels of user friction for each of the communication channels 230 associated with the user account 224 from the friction data 241 (FIG. 2).

In box 418, the authentication service 215 determines a subset of the communication channels 230 associated with the user account 224 through which portions 106 (FIG. 1) of the ephemeral security credential 103 are to be transmitted. The particular communication channels 230 are identified based upon a weighted combination of the corresponding measures of entropy, cost, user friction, and/or security assurance. For instance, numerous low entropy communication channels 230 may be used, or fewer high entropy communication channels 230 may be used. Likewise, numerous low security assurance communication channels 230 may be used, or fewer high security assurance communication channels 230 may be used. There may be a bias against selecting communication channels 230 that are associated with a high cost and/or a high level of user friction.

Ultimately, it may be desirable to leverage multiple communication channels 230 to improve security. For example, if an attacker has access to a user's mobile phone, text messaging, emails, and phone calls may be compromised. However, mail to the user's home and access to the user's home networked audio device may not be compromised. Yet, it may be desirable not to use all available communication channels 230 due to hassle to the user and inherent delay involved.

In box 419, the authentication service 215 generates an ephemeral security credential 103. The length and/or characters for the ephemeral security credential 103 may depend in part on the security required and/or the entropy supported by the set of communication channels 230 (FIG. 2) that are associated with the user account 224. As circumstances warrant, the ephemeral security credential 103 may comprise numbers, letters, non-alphanumeric characters, images, sounds, movements, or other data items.

In box 421, the authentication service 215 divides the ephemeral security credential 103 into corresponding portions 106 for each of the selected subset of communication channels 230. This may involve translation of a character set encoding. For instance, if a communication channel 230 supports only a numerical string, characters that are letters may be translated into numbers. Also, in some embodiments, rather than dividing a single ephemeral security credential 103 into multiple portions 106, multiple ephemeral security credentials 103 may be initially generated, where each one is used for a separate communication channel 230.

In box 424, the authentication service 215 sends the portions 106 of the ephemeral security credential 103 across the selected subset of the communication channels 230 associated with the user account 224 using respective communication channel connectors 218 (FIG. 2). The authentication service 215 may record information about the ephemeral security credential 103 and what has been sent in the ephemeral credential information 236 (FIG. 2). Next, the authentication service 215 moves into a verification phase. In one embodiment, the authentication service 215 may simply receive all of the portions 106 back from the user via a network page form generated in response to the login request.

In other embodiments, the authentication service 215 may proceed with selecting multiple communication channels 230 through which to receive the returned portions 106. For example, in box 427, the authentication service 215 may determine another subset of the communication channels 230 through which to receive the returned portions 106 of the ephemeral security credential 103. This subset may also be determined with respect to the respective measures of entropy, cost, user friction, and/or security assurance.

However, it is noted that the decision of which communication channels 230 through which to receive the portions 106 of the ephemeral security credential 103 may be influenced by additional factors. For example, if a user repeats a code by voice, biometric identification of the user (i.e., voice recognition) may be employed to enhance security. Such a process may have a low degree of security assurance (e.g., many people may have similar voices as far as the recognition algorithm may be concerned), coupled with other communication channels 230 and by receiving the portions 106 of the ephemeral security credential 103, overall security may be enhanced. It is noted that a different number of communication channels 230 may be employed to receive the portions 106 as opposed to sending them.

In box 430, the authentication service 215 may cause an instruction to be presented to the user via the client computing device 206 to provide the portions 106 of the ephemeral security credential 103 via the subset of the communication channels 230 determined in box 427. This instruction may take the form of text in the user interfaces 254a, 254b as in FIGS. 3A and 3B. Alternatively, a telephone call, text message, email, or other form of communication may be sent.

In box 433, the authentication service 215 receives portions 106 of the ephemeral security credential 103 via the subset of communication channels 230 using respective communication channel connectors 218. In box 434, the authentication service 215 determines whether the portions 106 are valid and constitute all of the requested portions 106.

The authentication service 215 may refer to the ephemeral credential information 236 to determine what is expected to be received from the user. In some embodiments, the order or timing in which the portions 106 are received may be significant to the decision to authenticate. For example, suppose that a code is being mailed to a user by first class mail, and the expected delay as indicated in the expected delay data 245 (FIG. 2) is three days. If the code is received within minutes instead, it may be assumed that there is a compromise somewhere in the system. The authentication service 215 may compare the difference between elapsed time and the expected delay with respect to a threshold. Also, some portions 106 may be intentionally sent after others so as to create a specific ordering that the user is instructed to reproduce.

Moreover, in some cases, a client computing device 206 may be authenticated for access despite not providing all portions 106. For example, the authentication service 215 may utilize a weighted combination formula to compute a score, where the score is then compared to a threshold in order to allow access. The weighting for each specific portion 106 may depend at least in part on the entropy and/or security assurance of the corresponding communication channel 230 through which it is transmitted. To illustrate, it may be that the user is not home and does not have access to receive from or dictate to a microphone of a networked audio device. By providing all other portions 106, authentication may be approved depending on the overall score. However, it may be that failure to provide a portion 106 provided in a text message may be considered fatal to the authentication.

If the valid requested portions 106 are not received, the authentication service 215 moves to box 435 and denies access to resources associated with the user account. Thereafter, the operation of the portion of the authentication service 215 ends. However, if the requested portions 106 are received and are valid, the authentication service 215 instead moves from box 434 to box 436. In box 436, the authentication service 215 authenticates the client computing device 206 for access to resources associated with the user account 224. After authentication, the operation of the portion of the authentication service 215 ends.

Figure 5:
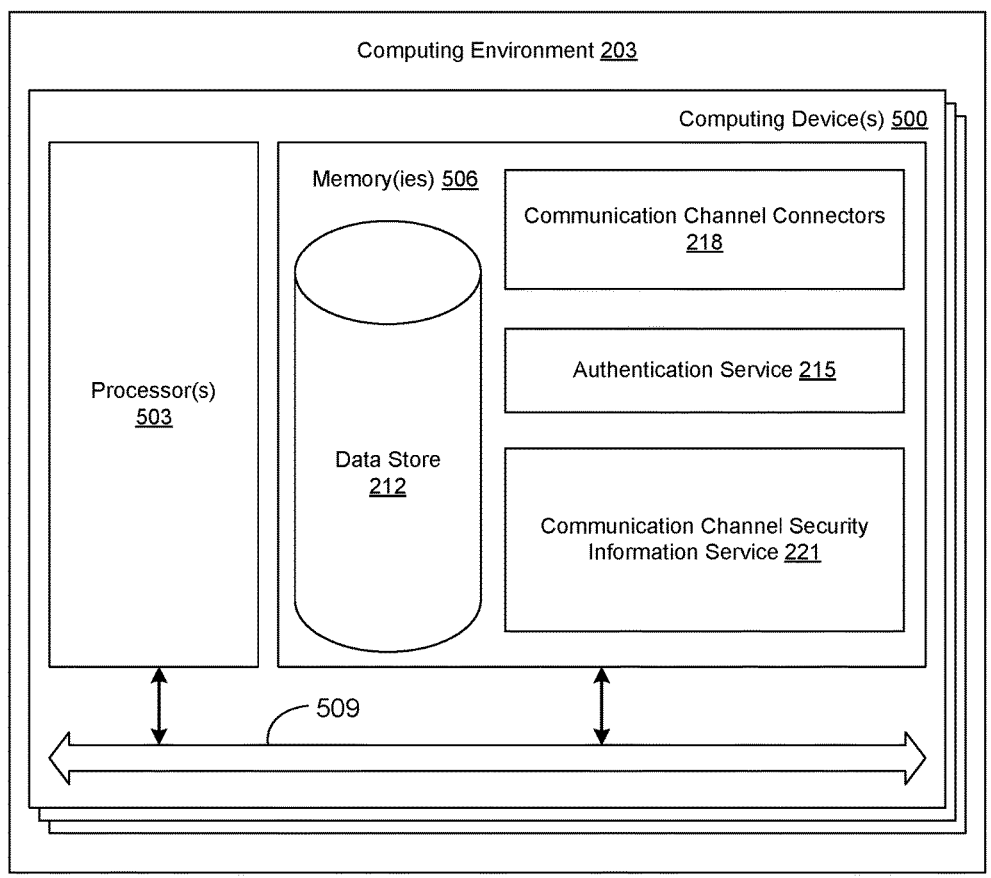
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the authentication service 215, the communication channel connectors 218, the communication channel security information service 221, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the authentication service 215, the communication channel connectors 218, the communication channel security information service 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the authentication service 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication service 215, the communication channel connectors 218, and the communication channel security information service 221, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the authentication service 215, the communication channel connectors 218, and the communication channel security information service 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
    receive a login request for a user account from a client computing device via a network;
    generate an ephemeral security credential for the user account;
    determine a first subset of a set of communication channels associated with the user account based at least in part on respective measures of entropy and security assurance corresponding to individual ones of the set of communication channels, wherein the respective measures of entropy are based at least in part on a number of potential security credentials that are supported by a given communication channel;
    divide the ephemeral security credential into a plurality of portions;
    send a corresponding portion of the plurality of portions of the ephemeral security credential across individual ones of the subset of the set of communication channels;
    determine a second subset of the set of communication channels based at least in part on the respective measures of entropy and security assurance corresponding to the individual ones of the set of communication channels;
    cause an instruction to be presented by the client computing device to provide the plurality of portions of the security credential via the second subset of the set of communication channels; and authenticate the client computing device for access to the user account in response to receiving the plurality of portions of the security credential via the second subset of the set of communication channels.

2. The non-transitory computer-readable medium of claim 1, wherein when executed the program further causes the at least one computing device to at least determine the respective measures of entropy based at least in part on a character set capability and a number of characters capability of at least one of the set of communication channels.

3. A system, comprising:
at least one computing device; and
at least one application executable in the at least one computing device, wherein when executed the at least one application causes the at least one computing device to at least:
determine a subset of a set of communication channels associated with the user account based at least in part on respective measures of entropy and respective measures of security assurance corresponding to individual ones of the set of communication channels, wherein the respective measures of entropy are based at least in part on a number of potential security credentials that are supported by a given communication channel;
generate a security credential for a user account;
divide the security credential into a plurality of portions;
send a corresponding portion of the plurality of portions of the security credential across individual ones of the subset of the set of communication channels; and
authenticate a client computing device for access to the user account based at least in part on receiving the plurality of portions of the security credential.

4. The system of claim 3, wherein the subset of the set of communication channels is determined further based at least in part on respective costs corresponding to the individual ones of the set of communication channels.

5. The system of claim 3, wherein the subset of the set of communication channels is determined further based at least in part on respective levels of user friction corresponding to the individual ones of the set of communication channels.

6. The system of claim 3, wherein when executed the at least one application causes the at least one computing device to at least determine whether to authenticate the client computing device based at least in part on an ordering in which the plurality of portions of the security credential are received and an expected latency for receiving at least one of the plurality of portions.

7. The system of claim 3, wherein when executed the at least one application causes the at least one computing device to at least:
receive data indicating a security status in regard to at least one of the set of communication channels; and
dynamically determine the respective measures of security assurance for the at least one of the set of communication channels based at least in part on the data indicating the security status.

8. The system of claim 7, wherein the data indicating the security status indicates that the at least one of the set of communication channels has recently been compromised.

9. The system of claim 7, wherein the data indicating the security status indicates that a security with respect to the at least one of the set of communication channels has been improved.

10. The system of claim 3, wherein at least two of the plurality of portions of the security credential are different sizes.

11. The system of claim 3, wherein a size of the corresponding portion is based at least in part on the respective measure of entropy of an individual communication channel.

12. The system of claim 3, wherein the security credential is an ephemeral security credential associated with a time-bound validity or a maximum number of uses.

13. The system of claim 3, wherein the set of communication channels include at least two of: an email address for sending email messages, a telephone number for sending text messages, a telephone number for sending voice messages, a mailing address for sending physical shipments, a social networking account for sending messages, a networked audio device for sending voice messages, or a payment instrument for making microdeposits.

14. The system of claim 3, wherein user access to at least one of the set of communication channels has been confirmed before the security credential is generated.

15. A method, comprising:
sending, via at least one of one or more computing devices, a plurality of portions of a security credential across individual ones of a first subset of a set of communication channels associated with a user account;
determining, via at least one of the one or more computing devices, a second subset of the set of communication channels based at least in part on respective measures of entropy and respective measures of security assurance corresponding to individual ones of the set of communication channels, wherein the respective measures of entropy are based at least in part on a number of potential security credentials that are supported by a given communication channel;
causing, via at least one of the one or more computing devices, an instruction to be presented by a client computing device to provide the plurality of portions of the security credential via the second subset of the set of communication channels; and
authenticating, via at least one of the one or more computing devices, the client computing device for access to the user account in response to receiving the plurality of portions of the security credential via the second subset of the set of communication channels.

16. The method of claim 15, wherein the first subset of the set of communication channels and the second subset of the set of communication channels include a different quantity of communication channels.

17. The method of claim 15, wherein at least one of the second subset of the set of communication channels includes a return audio path from a networked audio device.

18. The method of claim 15, wherein the instruction instructs the user to provide the plurality of portions of the security credential as a different plurality of portions via the second subset of the set of communication channels.

19. The method of claim 15, wherein the instruction instructs the user to provide the plurality of portions of the security credential in a particular order.

20. The method of claim 15, further comprising:
determining, via at least one of the one or more computing devices, an expected delay in receiving at least one of the plurality of portions; and
authenticating, via at least one of the one or more computing devices, the client computing device based at least in part on whether the at least one of the plurality of portions is received within a predefined threshold of the expected delay.

* * * * *